Feb. 24, 1970  J. B. WALKER  3,497,392
ELECTRIC CURRENT GENERATING CELL INCLUDING RADIOACTIVE MATERIAL
Filed Sept. 27, 1965  3 Sheets-Sheet 1

INVENTOR.
JOHN B. WALKER
BY
Brown, Critchlow,
Flick & Peckham.
ATTORNEYS.

United States Patent Office 3,497,392
Patented Feb. 24, 1970

3,497,392
ELECTRIC CURRENT GENERATING CELL INCLUDING RADIOACTIVE MATERIAL
John B. Walker, 8 Earlswood Ave.,
Mount Lebanon, Pa. 15228
Continuation-in-part of application Ser. No. 466,156, June 23, 1965. This application Sept. 27, 1965, Ser. No. 502,798
Int. Cl. H01m 15/02
U.S. Cl. 136—89                    13 Claims

ABSTRACT OF THE DISCLOSURE

A porous core in a case is sensitive to ultra-violet radiations produced by a fluid that surrounds the core and fills its pores and that is ionized by radioactive material surrounded by the core. The radiations activate the core to produce electric current that is conducted away from the core by means electrically connected with it and extending out of the case.

---

This application is a continuation-in-part of my patent application, Ser. No. 466,156, filed June 23, 1965, now abandoned.

Photoelectric batteries have been produced that contain solar cells which are energized by sunlight to produce electric current. Other batteries have been proposed that are energized by radioactive material therein, which ionizes a gas that acts upon chemically treated electrodes in the batteries to generate electricity. The efficiency of these latter batteries is low because the total electrode area that reacts to the ionized gas is quite limited.

It is among the objects of this invention to provide a photoelectric cell that is highly efficient for its size, that employs in its operation radiations that do not come from sunlight, and that is relatively simple and inexpensive in construction.

In accordance with this invention, the cell has a sealed case in which there is a photoelectric core that is sensitive to ultra-violet radiations. This core is provided with a multiplicity of cavities communicating with the outside of it and preferably interconnected with one another, whereby to provide the core with a very large surface area in relation to its size. The case also conatins an ionizable fluid that surrounds the photoelectric core and fills its cavities. This fluid is such that it produces ultra-violet radiations when ionized. It may be, for example, a mixture of argon gas and vaporized mercury. The fluid is ionized by the radiations of a charge of radioactive material that is surrounded by the photoelectric core. The resulting ultra-violet radiations activate the core to produce electric current, which can be led away from the cell by means electrically connected with the photo-electric core and extending out of the case.

Figure 1:
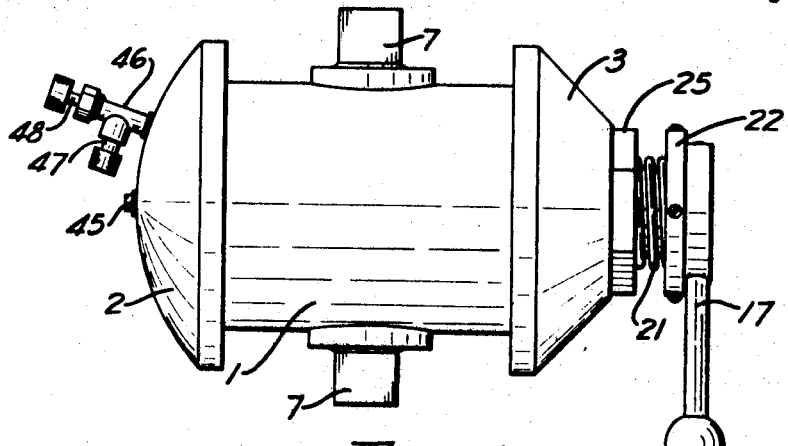
Figure 5:
Figure 2:
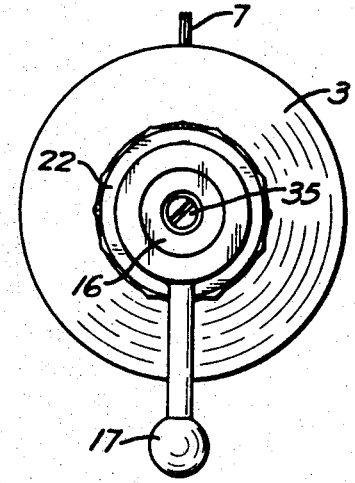
Figure 3:
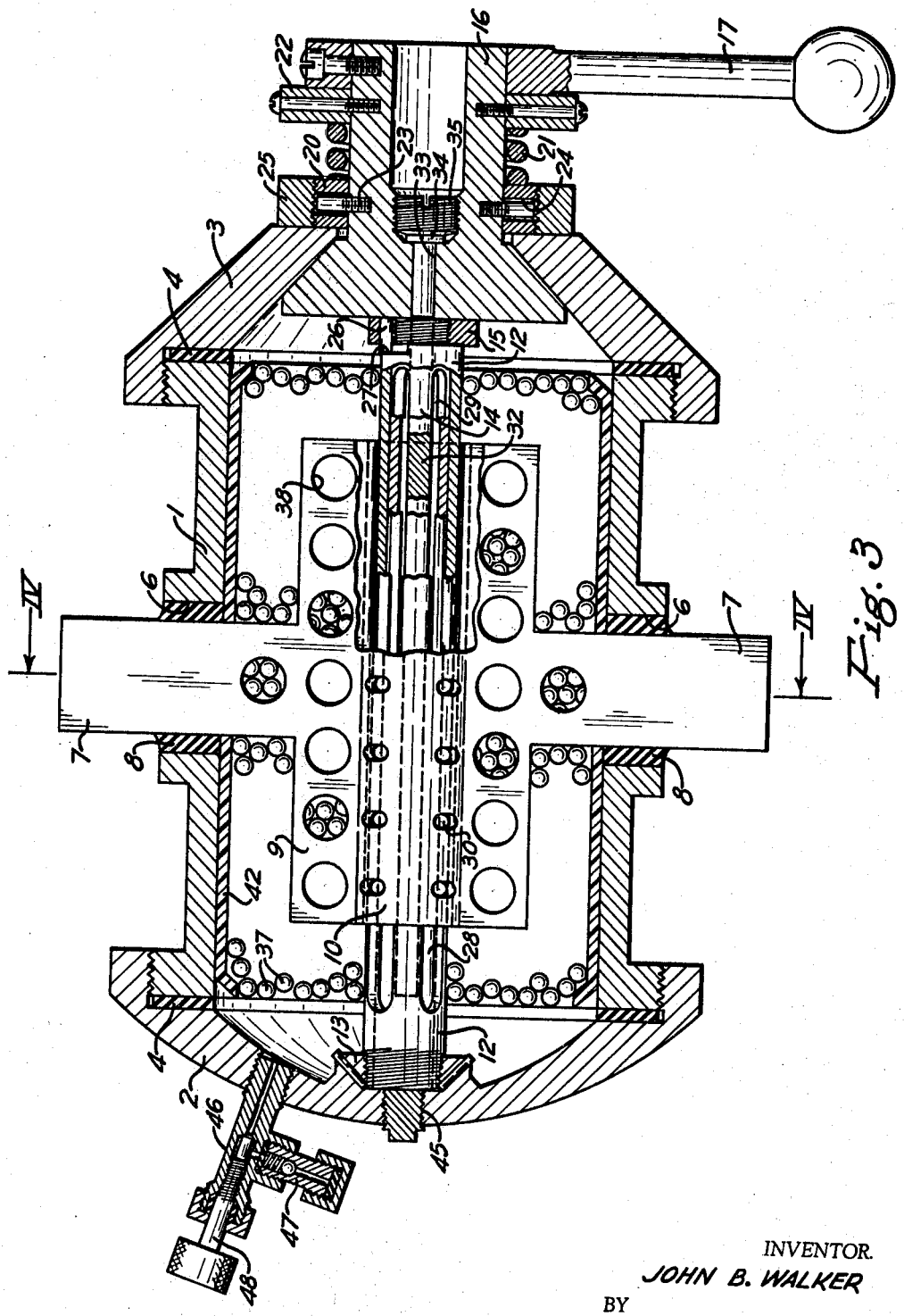
Figure 4:
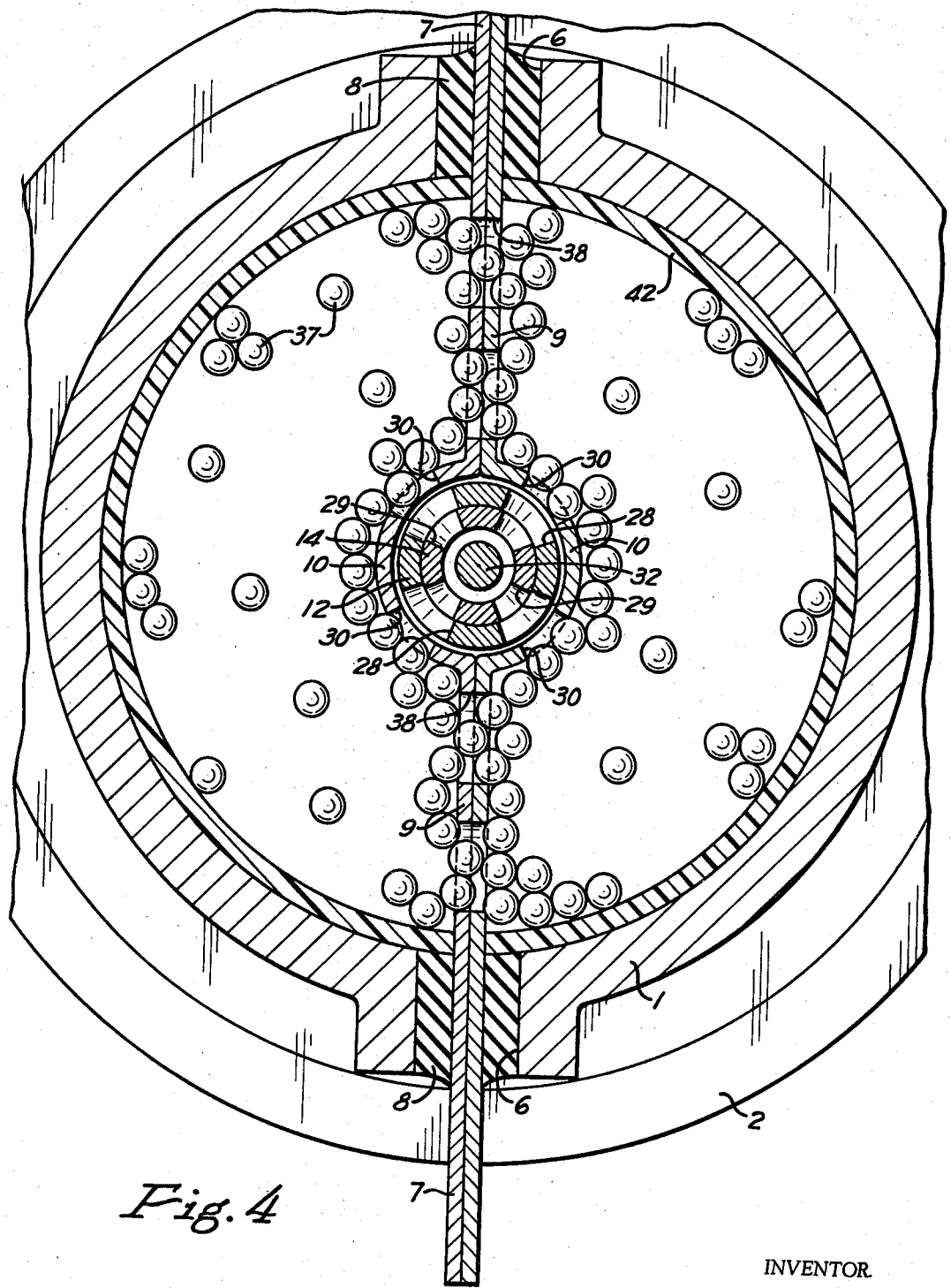

The preferred embodiment of the invention is illustrated in the accompanying drawings, in which FIG. 1 is a side view of the cell;
FIG. 2 is an end view thereof;
FIG. 3 is an enlarged longitudinal section of the cell, only a few of the solid mass of balls being shown;
FIG. 4 is a still further enlarged cross section of the cell, taken on the line IV—IV of FIG. 3; and
FIG. 5 is a greatly enlarged fragmentary section of the photoelectric core.

Referring to the drawing, the cell case may be formed from a metal cylinder 1, on the opposite ends of which end bells 2 and 3 are screwed, with gaskets 4 compressed between the bells and the ends of the cylinder. At diametrically opposite points the wall of the cylinder is provided with slots 6, through which flat electrical conductors 7 extend. The conductors are sealed in the slots by suitable sealing compound 8. As shown in FIG. 4, each conductor is formed from two strips of sheet metal, such as copper sheet, secured face-to-face with their inner ends joined to two sheet metal plates 9, also preferably copper. These plates also are joined face-to-face, except for their central portions which are curved away from each other to form a sleeve 10 extending axially of the case. It will be seen that the two conductors 7 support the sleeve in the center of the case.

Extending through the sleeve and projecting from its ends is a tube 12 which forms a valve housing slightly smaller than the inside of the sleeve so that the two are spaced apart. The tube is supported at one end by screwing it into a socket 13 on end bell 2 of the case. Rotatably mounted inside of this tubular housing is a valve tube 14 that projects from the free end of the outer tube. This projecting end of the valve tube is screwed into a socket 15 on the inner end of a valve stem 16 rotatably mounted in a central opening in the adjoining end bell 3 of the case. The portion of the valve stem inside the case is conical and engages the outwardly tapered inner surface of the encircling end bell. Rigidly mounted on the outer end of the valve stem is a handle 17 for turning it to rotate the valve tube in the control valve housing.

For holding the conical inner end of the valve stem snugly against the end bell, a ring 20 is slidably mounted on the outer portion of the valve stem and is pressed against the adjoining face of the end bell by means of a coil spring 21 compressed between the ring and a collar 22 attached to the valve stem. The ring is prevented from rotating on the stem by means of radial studs 23 screwed into the stem and projecting into enlarged radial openings 24 in the ring. To lock the valve stem in any desired position to which it may be turned, a lock nut 25 is threaded on ring 20 and can be screwed up tightly against the end bell. The distance that the valve stem can be turned by its handle is controlled by a pin 26 projecting inwardly from the socket 15 into an arcuate slot 27 in the adjoining end of the tubular valve housing. The two tubes are provided with openings that can be moved into and out of registry with each other when the valve stem is turned. Such openings may take the form of slots 28 and 29 extending lengthwise of the tubes. The sleeve 10 around the valve housing also is provided with a plurality of openings 30 registering with the slots in the housing.

The radioactive material that furnishes the energy for this battery preferably is in the form of a rod 32 mounted at its outer end in the reduced inner end portion of an axial passage 33 through the valve stem. The outer end of this fuel rod has a head 34 that is engaged by a plug 35 screwed into the passage. The rod extends through the center of the valve tube. Preferably, the radioactive material is one that emits alpha rays or beta rays preponderantly. For example, isotopes such as iron 55, strontium 90, plutonium 239, uranium 233, nickel 63 or thallium 20 can be used. Also thorium 232 and uranium 238 and 235 are satisfactory.

Another feature of this invention is that plates 9 and the encircled tubes are surrounded by a photoelectric unit or core that is sensitive to ultra-violet radiations artificially produced, as distinguished from sunlight. A distinguishing feature of this core is that it is provided with a great multiplicity of cavities that give it a very large surface area in relation to its size. In effect, it is a large unit that has been compressed into a small space. Although the photoelectric core may be formed in various ways, it is preferred to make it from a very large number of small balls or pellets 37, most suitably carbon, which completely fill the space around and beside plates 9. A convenient size for the pellets is about 3/16 inch in diameter. The metal plates may be provided with openings 38 large enough to permit some of the pellets to be disposed in them. As shown in FIG. 5, the pellets are bound together and to the plates by means of a film or thin layer 39 of silver deposited in any well-known manner. The pellets are bound to plates 9 in the same way, whereby the pellets form a rigid mass attached to the plates. The silver also covers the plates and the conductors and forms the anode of the battery.

The silver, in turn, is coated with one or more layers of material sensitive to ultra-violet radiations to form the cathode, such as, for example, cadmium sulfide 40, which is coated with a film 41 of indium. Lithium, rubidium and cesium also could be used, if desired. These coatings do not fill the spaces between the pellets, but leave the resulting photoelectric core porous with all of its pores 43 or cavities interconnected with one another inside the core and communicating with the outside of the core. The cathode material does not coat the part of one of the conductors 7 projecting from the case. The photoelectric core is insulated from the metal cylinder by means of an encircling cylinder 42 of a plastic, such as polyethylene, or other suitable material that will not deteriorate in the presence of radioactivity.

The center of end bell 2 is provided with a plugged threaded opening 45, through which enough mercury can be sprayed into the cell to cover the pellets with a fine vapor. At the time the mercury is introduced, the slots in the valve tube are in positions where they register with the slots in the valve housing, but the fuel rod is not inserted until after the mercury. With the rod in place and the control valve tube now closed, the case is filled with the ionizable gas, such as argon, although other inert gases such as xenon, krypton, neon or helium could be used. The filling is done through a fitting 46 attached to end bell 2 and provided with a check valve 47 and a shut off valve 48, which is open during filling. The check valve prevents escape of gas from the cell in case the shut off valve 48 is opened while the cell is pressurized. Before the gas is delivered to the cell, the case can be evacuated by a vacuum pump connected with check valve 47 and including a pin for holding the check ball off its seat. The ball also can be unseated in the same manner to bleed the cell when desired. If desired, the mercury can first be mixed with the inert gas before charging the mixture into the cell. As a precaution against the mercury forming an amalgam with indium coated cadmium when that is used, the indium can be covered with a protective film of a plastic that is pervious to ultra-violet light.

To start the cell generating electric current, the control valve is opened so that radiations from the fuel rod can pass outwardly through the slots in the tubes and the openings in the sleeve and ionize the surrounding gas. The ionized gas will vaporize the mercury so that ultraviolet radiations will be produced. Since the ionized fluid fills all of the innumerable cavities in the photoelectric core, the ultra-violet radiations will activate the walls of all of the cavities to emit electrons from the cathode surface to the anode surface and thereby generate electric current between the outer cathode layer and the sliver anode layer. Electricity can be lead away from the cell through wires connected to the projecting ends of the two conductors.

A simple way of producing electricity with this cell is to substitute hydrogen gas for the inert gas and mercury previously described. The hydrogen will be ionized by the radioactive material in the cell, so the cell will be filled with ionized hydrogen instead of an ionized fluid made up of mercury vapor and ionized inert gas. Since hydrogen, when ionized, gives off radiant energy in the form of ultra-violet of a definite wave length, vaporized mercury is unnecessary and the operation of the cell is simplified. This may lead to increased reliability and longer life of the cell. Also, as the ionization energy of hydrogen is rated at 13.58 ev., it is fairly easy to ionize. On the other hand, a disadvantage of hydrogen gas is that it is inflammable and, not being inert, it could form compounds which could cause local contamination if a leak occurred in the cell casing.

Certain metals are more sensitive or reactive to certain light frequencies than to others. Thus, potassium is very sensitive to light in the violet segment of the electromagnetic spectrum, while lithium is sensitive to radiations in the orange region. By coating the cell core with the proper fluorescent substance and irradiating it with ultra-violet light, the color of the light in the cell can be adapted to the one most suited to produce electron emission from the particular metal coatings used. The color of the light also can be controlled by a gas pressure within the cell case; an increase in pressure shifting the ultraviolet range into a lower frequency.

According to the provision of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. An electric current generating cell comprising a sealed case, a photoelectric core inside the case sensitive to ultra-violet radiations, said core having therein a multiplicity of cavities communicating with the outside of the core to provide it with a very large surface area in proportion to its size, an ionizable fluid in the case that produces ultra-violet radiations when ionized, said fluid surrounding said core and filling its cavities, radioactive material surrounded by said photoelectric core and ionizing said fluid, whereby the resulting ultra-violet radiations activate said core to produce electric current, and means electrically connected with said core and extending out of the case for conducting said current away from the photoelectric core.

2. A cell according to claim 1, in which said cavities are interconnected with one another.

3. A cell according to claim 1, in which said photoelectric core includes a mass of pellets, and ultra-violet radiation sensitive coatings cover the pellets.

4. A cell according to claim 1, in which said photoelectric core includes a mass of pellets, a layer of silver on the pellets binds them together, and an ultra-violet radiation sensitive coating covers the silver layer.

5. A cell according to claim 4, in which said pellets are carbon.

6. A cell according to claim 1, in which said ionizable fluid is a mixture of an inert ionizable gas and vaporized mercury.

7. A cell according to claim 1, in which said radioactive material emits alpha rays preponderantly.

8. A cell according to claim 1, in which said radioactive material emits beta rays preponderantly.

9. A cell according to claim 1, in which said ionizable fluid is hydrogen gas.

10. An electric current generating cell comprising a sealed case, a metal sleeve in the center of the case, a mass of pellets surrounding the sleeve, a layer of silver on the pellets and the sleeve binding them together into a rigid unit having therein a multiplicity of cavities, an ultra-violet radiation sensitive coating on the silver layer, an ionizable fluid in the case that produces ultra-violet radiations when ionized, said fluid surrounding said unit and filling its cavities, radioactive material inside said sleeve ionizing said fluid, whereby the resulting ultraviolet radiations activate said unit to produce electric current, and means electrically connected with said sleeve and extending out of the case for conducting said current away from said unit.

11. A cell according to claim 9, in which the side wall of said sleeve is provided with openings, a rotatable tubular valve containing said radioactive material is mounted in the sleeve and is provided in its side wall with openings, and there is means for turning said valve to move its openings into and out of registry with said openings in the sleeve.

12. An electric current generating cell comprising a sealed case, a sheet metal member in the case provided centrally with a sleeve, a mass of pellets surrounding the sleeve, a layer of silver on the pellets and sheet metal member binding them together into a rigid unit having therein a multiplicity of cavities, an ultra-violet radiation sensitive coating on the silver layer, an ionizable fluid in the case that produces ultra-violet radiations when ionized, said fluid surrounding said unit and filling its cavities, radioactive material inside said sleeve ionizng sad fluid, whereby the resulting ultra-violet radiations activate said unit to produce electric current and means electrically connected with said sheet metal member and extending out of the case for conducting said current away from said unit.

13. A cell according to claim 12, in which said conducting means are extensions of said sheet metal member and are rigidly mounted in the side wall of said case to support said member in fixed position in the case.

References Cited

UNITED STATES PATENTS

| | | | |
|---|---|---|---|
| 3,026,439 | 3/1962 | Geer | 310—4 |
| 3,031,519 | 4/1962 | Silverman | 136—89 |
| 3,037,067 | 5/1962 | Bartolomei | 136—89 |
| 3,299,299 | 1/1967 | Dickinson | 310—4 |
| 3,313,961 | 4/1967 | Bensimon et al. | 136—89 X |
| 3,322,978 | 5/1867 | Lary et al. | 310—4 |

FOREIGN PATENTS 45,124   10/1961   Poland.

ALLEN B. CURTIS, Primary Examiner

U.S. Cl. X.R.

310—2, 4